US009893928B2

(12) United States Patent
Wang et al.

(10) Patent No.: US 9,893,928 B2
(45) Date of Patent: Feb. 13, 2018

(54) METHOD AND APPARATUS FOR PEAK TO AVERAGE POWER RATIO REDUCTION

(71) Applicant: Telefonaktiebolaget LM Ericsson (publ), Stockholm (SE)

(72) Inventors: Chen Wang, Beijing (CN); Jinsong Yang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 36 days.

(21) Appl. No.: 15/031,025

(22) PCT Filed: Oct. 22, 2013

(86) PCT No.: PCT/CN2013/085679
§ 371 (c)(1),
(2) Date: Apr. 21, 2016

(87) PCT Pub. No.: WO2015/058357
PCT Pub. Date: Apr. 30, 2015

(65) Prior Publication Data
US 2016/0269219 A1    Sep. 15, 2016

(51) Int. Cl.
*H04L 27/00*    (2006.01)
*H04L 27/38*    (2006.01)
*H04L 27/26*    (2006.01)

(52) U.S. Cl.
CPC ...... *H04L 27/3872* (2013.01); *H04L 27/2621* (2013.01)

(58) Field of Classification Search
CPC .. H04L 27/00; H04L 27/3872; H04L 27/2621
See application file for complete search history.

(56) References Cited

U.S. PATENT DOCUMENTS 8,169,959 B2    5/2012 Yang et al.
8,185,065 B2    5/2012 McCallister et al.
(Continued)

FOREIGN PATENT DOCUMENTS

| CN | 102244632 A | 11/2011 |
|---|---|---|
| CN | 103107971 A | 5/2013 |
| WO | 2010017506 A1 | 2/2010 |

OTHER PUBLICATIONS

Cimini, L. J. et al., "Peak-to-Average Power Ratio Reduction of an OFDM Signal Using Partial Transmit Sequences", IEEE Communications Letters, IEEE Service Center, Piscataway, NJ, US, vol. 4, No. 3, Mar. 1, 2000, pp. 86-88.
(Continued)

*Primary Examiner* — Ricky Ngo
*Assistant Examiner* — Lan Huong Truong
(74) *Attorney, Agent, or Firm* — Murphy, Bilak & Homiller, PLLC

(57) ABSTRACT

One of the embodiments of the present disclosure relates to a method for PARP reduction. The method comprises iteratively adjusting, based on a computed peak power value for a combined transmission signal including respective components of a plurality of frequency resource units, a phase rotation vector which is applied to said respective components of said plurality of frequency resource units to perform phase rotation on said respective components of said plurality of frequency resource units, until a newly-computed peak power value dependent upon the adjusted phase rotation vector is lower than or equal to a pre-defined peak power threshold or an iteration number reaches a pre-defined maximum value; performing phase rotation on said respective components of said plurality of frequency resource units by applying the adjusted phase rotation vector; and transmitting the combined transmission signal of said respective components of said plurality of frequency resource units
(Continued)

phase-rotated by said adjusted phase rotation vector. The present disclosure also relates to corresponding transmitter.

15 Claims, 4 Drawing Sheets

(56) References Cited

U.S. PATENT DOCUMENTS

| | | | |
|---|---|---|---|
| 8,254,476 B2* | 8/2012 | Ohwatari | H04L 25/03343 375/260 |
| 2007/0189414 A1* | 8/2007 | Kawasaki | H04L 27/2621 375/295 |
| 2009/0086848 A1* | 4/2009 | Han | H04L 5/0023 375/295 |
| 2011/0274186 A1 | 11/2011 | Lain et al. | |
| 2011/0281534 A1* | 11/2011 | Liao | H04L 27/2621 455/127.1 |
| 2012/0051454 A1* | 3/2012 | Zheng | H04L 5/0048 375/295 |

OTHER PUBLICATIONS

Han, S. H. et al., "PAPR Reduction of OFDM Signals Using a Reduced Complexity PTS Technique", IEEE Signal Processing Letters, IEEE Service Center, Piscataway, NJ, US, vol. 11, No. 11, Nov. 1, 2004, pp. 887-890.

Kim S-S, et al., "PAPR Reduction of OFDM Signals Using Genetic Algorithm PTS Technique", IEICE Transactions on Communications, Communications Society, Tokyo, JP, vol. E91B, No. 4, XP-001513864, Apr. 1, 2008, pp. 1194-1197.

Li, Ye Geoffrey, et al., Section 6.5, "Techniques for Distortionless PAPR-Reduction", XP055372622, ISBN: 978-0-387-29095-9, Retrieved from the Internet: URL: https://ebookcentral.proquest.com/lib/epo-ebooks/reader.action?docID=302951&ppg=226, May 31, 2006, pp. 217-241.

* cited by examiner

METHOD AND APPARATUS FOR PEAK TO AVERAGE POWER RATIO REDUCTION

TECHNICAL FIELD

The present disclosure relates to signal processing, and more particularly to methods and apparatus for peak to average power ratio (PAPR) reduction.

DESCRIPTION OF THE RELATED ART

Multicarrier transmission has been widely used in wireless as well as wireline applications due to the advances in digital signal processing technology. However, one of the major drawbacks of multicarrier transmission is the high peak-to-average power ratio (PAPR) of the transmit signal. If the peak transmit power is limited by either regulatory or application constraints, the effect of high PAPR is to reduce the average power allowed under multicarrier transmission relative to that under constant power modulation techniques. This in turn reduces the range of multicarrier transmission. Moreover, the high PAPR also leads to very challenging design for power amplifier (PA). To be specific, to prevent spectral growth of the multicarrier signal in the form of inter-modulation among subcarriers and out-of-band radiation, the transmit PA must be operated in its linear region (i.e., with a large input backoff), where the power conversion is inefficient.

A kind of methods to reduce PAPR relies on phase rotation. FIG. 1 shows a schematic block diagram of an apparatus 100 which implements PAPR reduction via phase rotation. The apparatus consists of modulation blocks 110-1, 110-2, . . . , 110-N, each of which processes the information bits to the modulated symbols including coding, interleaving, mapping etc.; storage blocks 120-1, 120-2, . . . , 120-N, each of which stores the symbols; phase rotation blocks 130-1, 130-2, . . . , 130-N, each of which rotates the symbols on the same subcarrier to a certain phase; interpolation blocks 140-1, 140-2, . . . , 140-N, each of which up-samples and filters the signal; mixers 150-1, 150-2, . . . , 150-N, each of which converts the baseband signal to its corresponding carrier; a combiner 160 which adds up the signal from different carriers to form a combined transmission signal.

For example, in an orthogonal frequency divisional multiplex (OFDM) system, an input data block of N symbols may be partitioned into disjoint sub-blocks. The subcarriers in each sub-block can be weighted by a phase rotation value for that sub-block. By carefully selecting the phase rotation values, the PAPR of the combined transmission signal can be reduced.

The most challenging difficulty with existing phase rotation based methods is the complexity. The PAPR can only be significantly reduced by using some optimal phase rotation values. There are methods generating the phase rotation values by exhaustive search which however can hardly be used in real-time application. Some other methods propose to calculate the optimal phase rotation values in advance. However, since normally the transmit information bits are random, it may require a very huge storage space to record the optimal values for every possible transmitting signals. Other variants try to reduce the storage space by searching on a portion of the signals (e.g. pilot signal), but it cannot guarantee the optimal phase rotation values for the entire signal. Even with such portion optimization, it still needs a lot of storage space for all configurations. For example, one need to store 6,291,456 ($128 \times 2^{12} \times 12$)) phase rotation values for only optimizing the BMI part of the TD-SCDMA signal for 12 carriers. Alternatively, in some methods, the selection of the phase rotation factors is limited to a set with a finite number of elements to reduce the search complexity. However, the quantization on phase rotation factor prevent from finding the optimal phase rotation values, which limits the PAPR reduction. Even with quantized phase rotation factors, the search complexity increases exponentially with the number of sub-blocks. Furthermore, in some applications, the side information needs to be transmitted to the receiver to recover the original data block, which results in data rate loss however.

Therefore, there is a need to reduce the complexity of phase rotation based methods meanwhile still maintaining an efficient performance in PAPR reduction.

SUMMARY OF THE INVENTION

To solve at least one of the problems in the prior art, one or more method and apparatus embodiments according to the present disclosure aim to provide a solution for PAPR reduction.

According to an aspect of the present disclosure, an embodiment of the present disclosure provides a method for PAPR reduction. The method comprises iteratively adjusting a phase rotation vector $\vec{\phi}(k)$ based on a computed peak power value P(k) for a combined transmission signal including respective components of a plurality of frequency resource units, until a predefined condition is satisfied. The phase rotation vector $\vec{\phi}(k)$ is applied to the respective components of the plurality of frequency resource units to perform phase rotation on the respective components of the plurality of frequency resource units. According to the embodiments of the present disclosure, the predefined condition can be either of condition 1): a newly-computed peak power value P(k+1) dependent upon the adjusted phase rotation vector $\vec{\phi}(k+1)$ is lower than or equal to a pre-defined peak power threshold; or condition 2) an iteration number reaches a pre-defined maximum value. The method further comprises performing phase rotation on the respective components of the plurality of frequency resource units by applying the adjusted phase rotation vector $\vec{\phi}(k+1)$; and transmitting the combined transmission signal of the respective components of the plurality of frequency resource units phase-rotated by the adjusted phase rotation vector $\vec{\phi}(k+1)$.

According to an aspect of the present disclosure, an embodiment of the present disclosure provides a transmitter. The transmitter comprises a peak power computing unit configured to compute a peak power value P(k) for a combined transmission signal including respective components of a plurality of frequency resource units. The transmitter further comprises a phase rotation vector adjusting unit configured to iteratively adjust a phase rotation vector $\vec{\phi}(k)$ based on the peak power value P(k) computed by the peak power computing unit, until a predefined condition is satisfied. The phase rotation vector $\vec{\phi}(k)$ is applied to the respective components of the plurality of frequency resource units to perform phase rotation on the respective components of the plurality of frequency resource units. According to the embodiments of the present disclosure, the predefined condition can be either of condition 1): a peak power value P(k+1) newly computed by the peak power computing unit dependent upon the adjusted phase rotation vector $\vec{\phi}(k+1)$ is lower than or equal to a pre-defined peak power threshold; or condition 2): an iteration number reaches a pre-defined maximum value. The transmitter further comprises a phase rotating unit and a transmitting unit. The phase rotating unit is configured to perform phase rotation on the respective components of the plurality of frequency resource units by applying the adjusted phase rotation vector $\vec{\phi}(k+1)$. The transmitting unit is configured to transmit the combined transmission signal of the respective components of the plurality of frequency resource units phase-rotated by the phase rotating unit. In some embodiments of the present disclosure, the transmitter may be a base station or a user equipment.

According to one or more embodiments of the present disclosure, the iteration process for adjusting the phase rotation vector is employed to determine an optimum phase rotation vector over finite-time iterations. The embodiments according to the present disclosure can achieve a good PAPR reduction level; at meanwhile, they also significantly reduce the computation complexity and save the storage space required in determining the optimum phase rotation vector due to the simplicity of the iteration process.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF THE PREFERRED EMBODIMENT

Hereinafter, embodiments of the present disclosure will be described with reference to the accompanying drawings. In the following description, many specific details are illustrated so as to understand the present disclosure more comprehensively. However, it is apparent to the skilled in the art that implementation of the present disclosure may not have these details. Additionally, it should be understood that the present invention is not limited to the particular embodiments as introduced here. On the contrary, any arbitrary combination of the following features and elements may be considered to implement and practice the present invention, regardless of whether they involve different embodiments. Thus, the following aspects, features, embodiments and advantages are only for illustrative purposes, and should not be understood as elements or limitations of the appended claims, unless otherwise explicitly specified in the claims.

Figure 1:
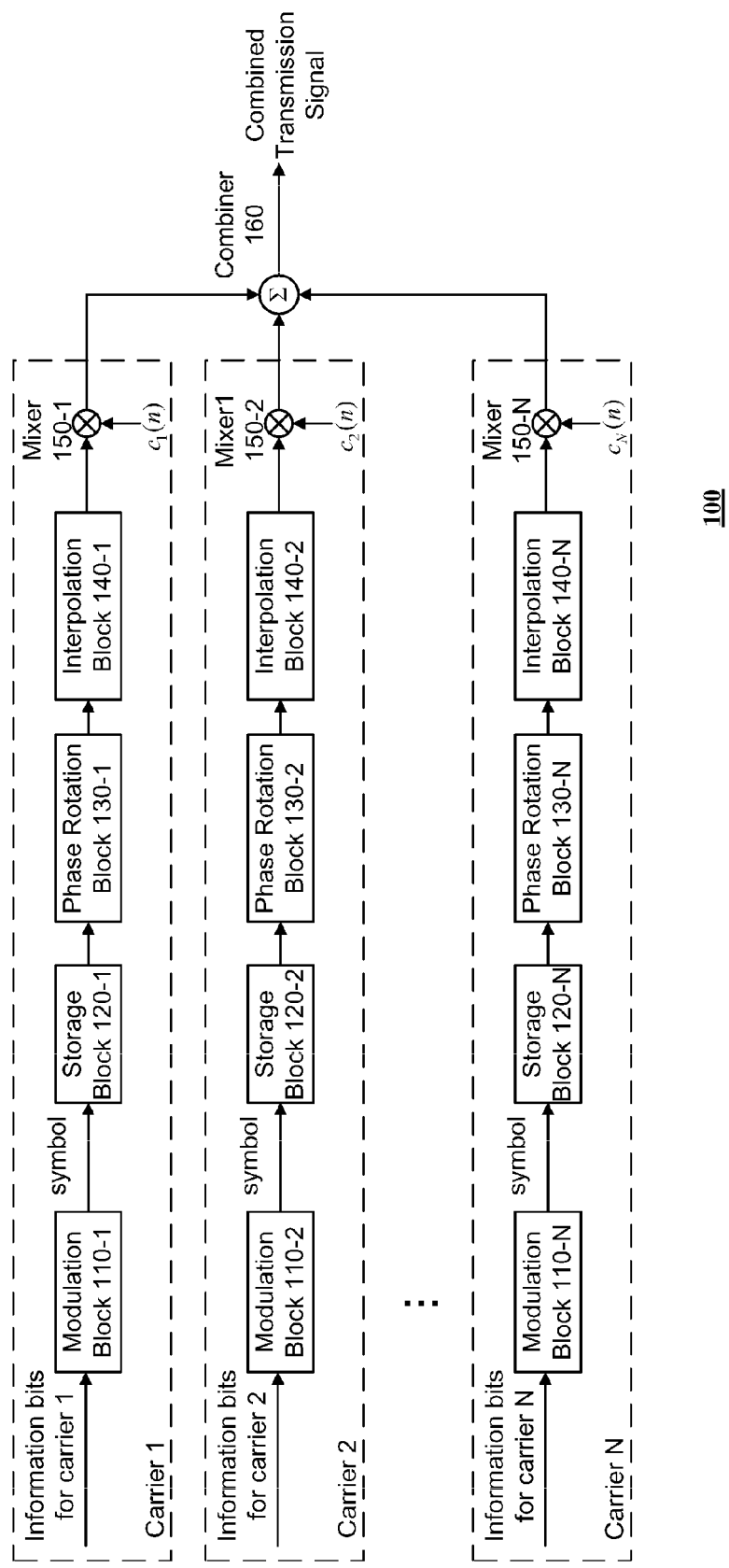
FIG. 1 shows a schematic block diagram of an apparatus which implements PAPR reduction via phase rotation.
Figure 2:
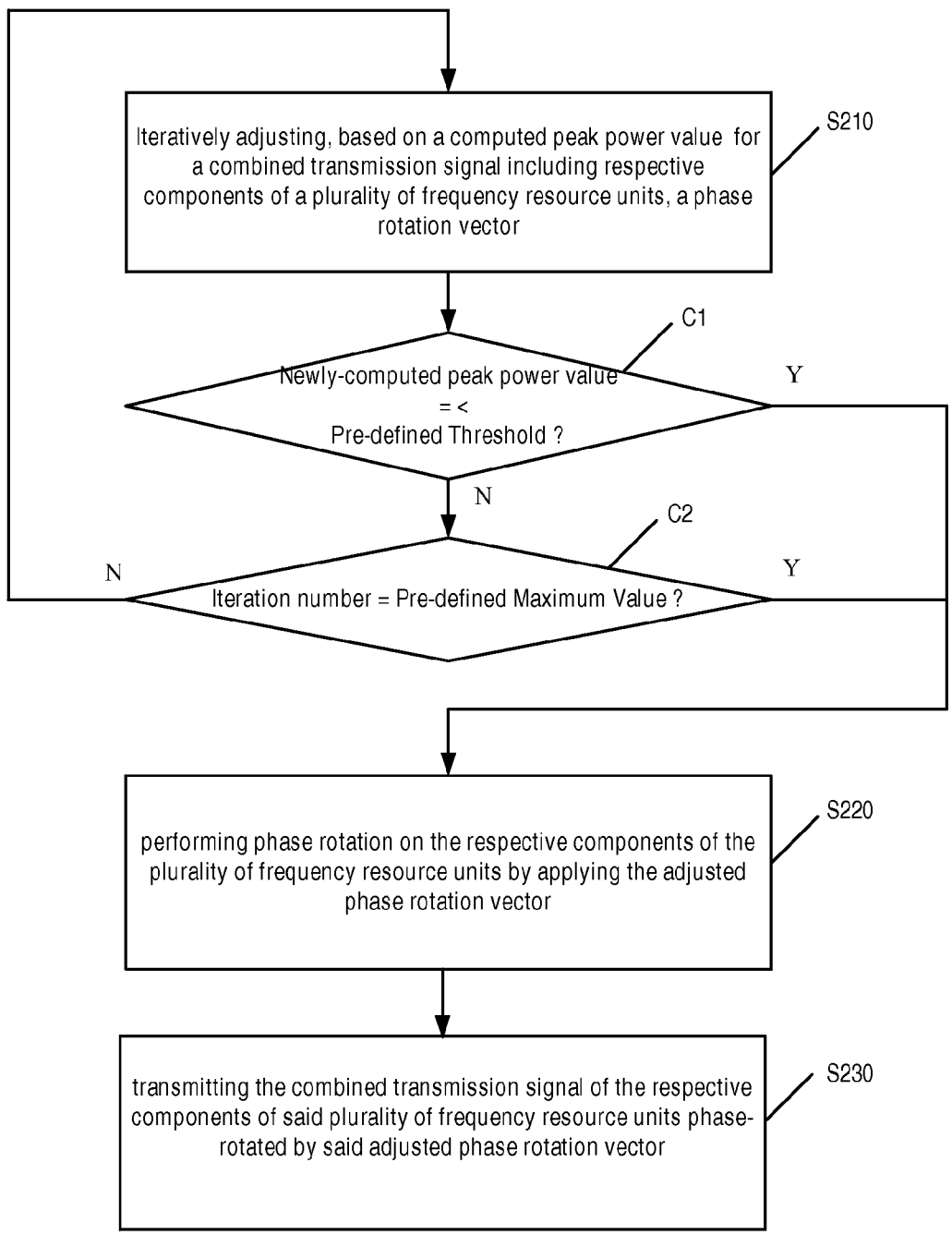
FIG. 2 schematically illustrates an exemplary flow chart of a method for PAPR reduction according to one or more embodiments of the present disclosure.
Figure 4:
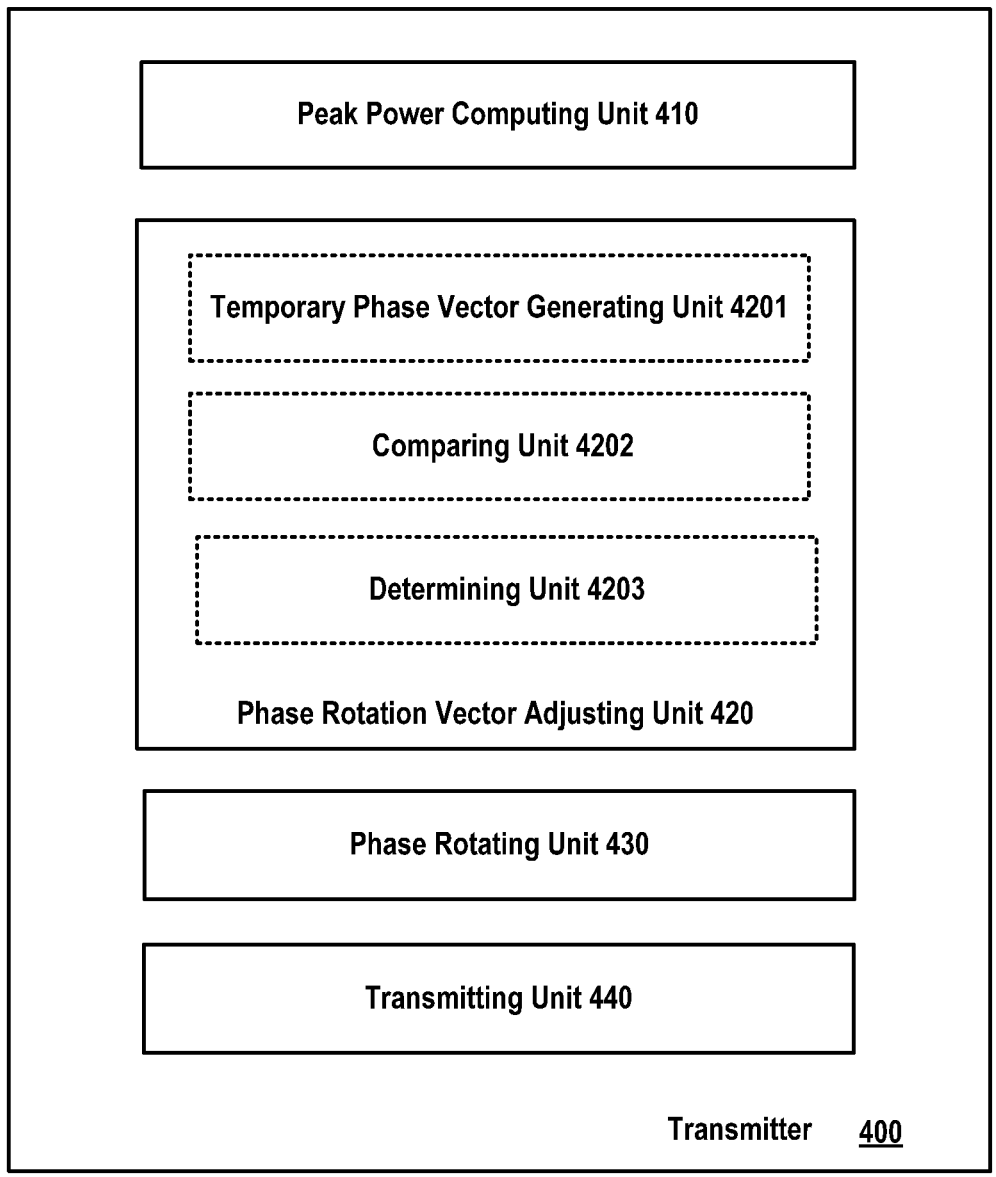
FIG. 4 schematically illustrates a block diagram of a transmitter according to one or more embodiments of the present disclosure.

With reference to FIGS. 2 and 4, various embodiments of the present disclosure will be set forth in detail.

FIG. 2 schematically illustrates an exemplary flow chart of a method for PAPR reduction according to one or more embodiments of the present disclosure.

In block S210, a phase rotation vector $\vec{\phi}(k)$ is iteratively adjusted based on a computed peak power value P(k) for a combined transmission signal, which indicates the maximal amplitude of the combined transmission signal, where k denotes an index of the iteration number and may be, for example, a positive integer. The combined transmission signal includes respective components of a plurality of frequency resource units. For example, the plurality of frequency resource units can be comprised of multiple subcarriers in OFDM-based system or one or more carriers in other system such as a GSM system. The phase rotation vector $\vec{\phi}(k)$ is used to be applied to the respective components of the plurality of frequency resource units to perform phase rotation on the respective components of the plurality of frequency resource units. According to one or more embodiments of the present disclosure, each of the frequency resource units may comprise one or more carriers or subcarriers, which may as a whole be phase rotated by a respective phase rotation element of the phase rotation vector $\vec{\phi}(k)$.

Consider an exemplary implementation where each of the frequency units contains only one carrier without loss of generality. A signal flow may be as follows: a certain amount of information bits are modulated to form the symbols and then stored to the memory, denoted as $S_i(n)$ for carrier i and $n=0 \ldots N_s$, where $N_s$ denotes the number of the symbols. The phase of the symbols is rotated by multiplying the symbol with $e^{j\varphi_i(k)}$, where $\varphi_i(k)$ ($0 \le \varphi_i(k) \le 2\pi$) denotes the $i^{th}$ phase rotation element of the phase rotation vector $\vec{\phi}(k)$ for carrier i, which is produced by the phase adjusting block S110. The process of phase rotation may be expressed as $$S_i'(n) = S_i(n) e^{j\varphi_i(k)} \quad 1)$$

Then the rotated symbols are up-sampled and filtered according to system design and requirement, denoted as $S_i^I(n) = I(S_i'(n))$ where $I(\bullet)$ denotes the interpolation and filtering function.

Next, the waveform are converted to the corresponding carrier frequency by multiplying the carrier $c_i(n) = e^{j2\pi f_i \Delta T n}$, where $f_i$ denotes the carrier offset for carrier i and $\Delta T$ denotes the sampling interval. The final waveform of the combined transmission signal may be generated by summarizing all the components of all carriers, which may be denoted as $$S(n) = \sum_{i=1}^{N} S_i^I(n) c_i(n) \quad 2)$$

where N denotes the number of carriers, i.e., the number of frequency resource units.

In the above-discussed exemplary implementation, the phase rotation is performed directly on the signal flow as illustrated by equation 1). Alternatively, the phase rotation may be applied in the carrier initial phase. In this regard, instead of the signal flow $S_i(n)$, the $i^{th}$ phase rotation element $\varphi_i(k)$ of the phase rotation vector $\vec{\phi}(k)$ for carrier i may be multiplied with the $i^{th}$ carrier $c_i(n) = e^{j2\pi f_i \Delta T n}$ as follows $$c_i'(n) = c_i(n) e^{j\varphi_i(k)} \quad 3).$$

The final waveform of the combined transmission signal may be generated by summarizing all the components of all carriers, which may be denoted as $$S(n) = \sum_{i=1}^{N} I(S_i(n)) c_i'(n) \quad 4)$$

where N denotes the number of carriers; $I(\bullet)$ denotes the interpolation and filtering function.

This approach may save hardware and/or software computational cost of the interpolation and filtering. However, it may need much larger memory size than the implementation illustrated by equations 1) and 2).

According to various embodiments of the present disclosure, the phase rotation vector can be determined by an iterative process, where the phase rotation vector are disturbed and the good disturbance is kept, while the bad ones are discarded, so as to achieve an optimum PAPR reduction for the combined transmission signal. Hereinafter, the iteration process of adjusting the phase rotation vector will be described in detail with reference to FIG. 3.

The iteration process for adjusting the phase rotation vector is continuously performed until a newly-computed peak power value P(k+1) dependent upon the adjusted phase rotation vector $\vec{\phi}$(k+1) is lower than or equal to a pre-defined peak power threshold (Condition 1) or the current iteration number k+1 has reached a pre-defined maximum value (Condition 2).

According to one or more embodiments of the present disclosure, the convergence rate is relatively fast while the required number of iteration is relatively small. Those skilled in the art can appreciate that if it needs to take a relative large number of iterations to achieve the lowest peak power, normally, most of the benefits can be obtained by first finite-time iterations, for example 50 iterations. Therefore, an optional Condition 2), i.e., a pre-defined maximum iteration value would be advantageous.

Once either of Conditions 1) or 2) is satisfied, the iteration process for adjusting the phase rotation will be terminated and the process flow will proceed with blocks S220 and S230.

In block S220, phase rotation is performed on the respective components of the plurality of frequency resource units by applying the adjusted phase rotation vector $\vec{\phi}$(k+1).

In one embodiment of the present disclosure, similar to the approach as illustrated by equations 1) and 2), phase rotation may be performed on the respective components of the plurality of frequency resource units by applying the adjusted phase rotation vector $\vec{\phi}$(k+1) on signals to be modulated on the plurality of frequency resource units. In this regard, a respective phase rotation element of the phase rotation vector $\vec{\phi}$(k) is configured to be applied to a corresponding baseband signal prior to carrier or subcarrier modulation. After the phase rotation, the rotated signal is modulated on the corresponding frequency resource unit by multiplying the rotated signal with the corresponding frequency resource unit.

In an alternative embodiment of the present disclosure, similar to the approach as illustrated by equations 3) and 4), phase rotation may performed on the respective components of the plurality of frequency resource units by applying the adjusted phase rotation vector $\vec{\phi}$(k+1) on the plurality of frequency resource units.

In block S230, the combined transmission signal including the respective components of the plurality of frequency resource units phase-rotated by said adjusted phase rotation vector $\vec{\phi}$(k+1) is transmitted.

Figure 3:
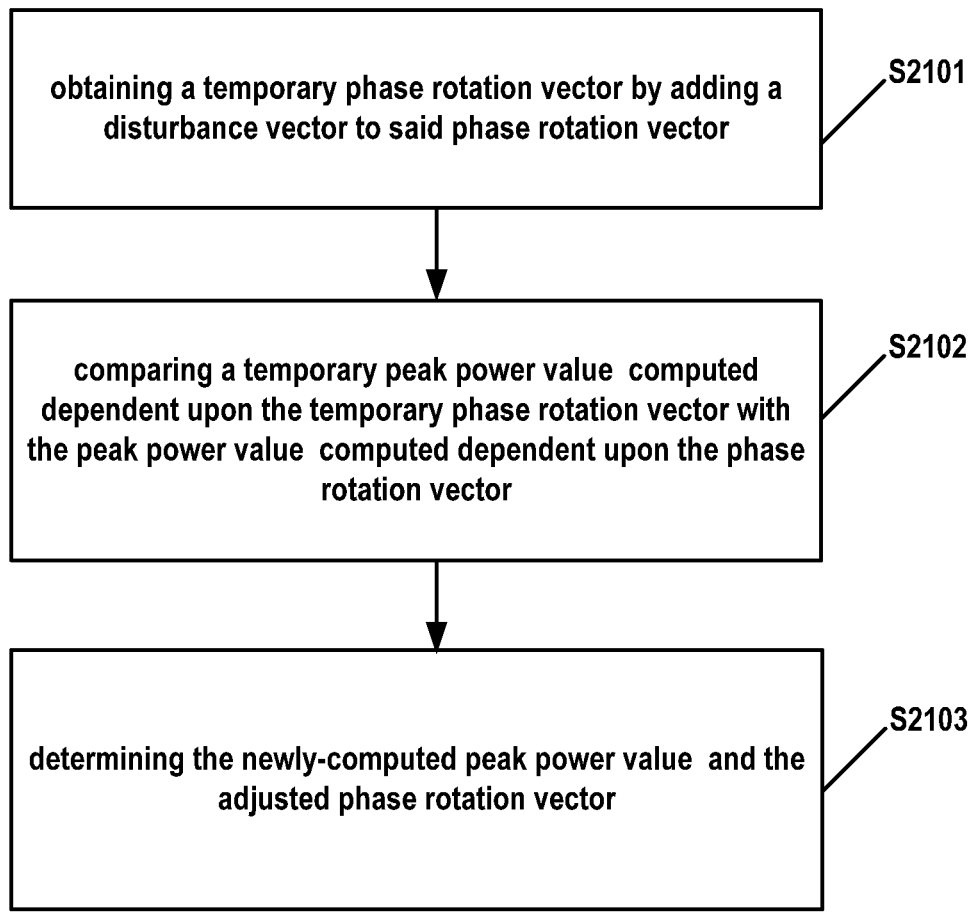
FIG. 3 schematically illustrates an exemplary process of adjusting the phase rotation vector according to one or more embodiments of the present disclosure.

FIG. 3 schematically illustrates an exemplary process of adjusting (S210) the phase rotation vector according to one or more embodiment of the present disclosure.

In block S2101, in the (k+1)$^{th}$ iteration, a temporary phase rotation vector $\vec{\phi}$'(k+1) is obtained by adding a disturbance vector to the phase rotation vector $\vec{\phi}$(k).

In one or more embodiments of the present disclosure, in the initialization phase, the iteration index k is initiated with value 1, i.e., k=1, and the phase rotation vector is initiated by $\vec{\phi}$(1)=[φ$_1$(1),φ$_2$(1), . . . , φ$_N$(1)]$^T$=$\vec{\phi}_{init}$, where N denotes the number of the plurality of frequency resource units. The vector $\vec{\phi}_{init}$ can be randomly generated or loaded from a pre-defined table, e.g. all-zeros. The combined transmission signal S(n) can be computed dependent upon the phase rotation vector $\vec{\phi}$(1), and the largest peak power value of S(n), denoted as P(1), is expressed as follows:

$$P(1)=\max(S(n|\vec{\phi}(1))) \quad 5)$$

For each iteration, a disturbance vector is generated and added to the phase rotation vector to form an adjusted phase rotation vector.

In the (k+1)$^{th}$ iteration, a temporary phase rotation vector $\vec{\phi}$'(k+1) may be expressed as follows:

$$\vec{\phi}'(k+1)=\vec{\phi}(k)+\vec{D}(k) \quad 6)$$

where $\vec{D}$(k) denotes a disturbance vector.

In one embodiment of the present disclosure, the disturbance vector $\vec{D}$(k) may be configured as a random disturbance vector. For example, the disturbance vector $\vec{D}$(k) may be defined as a product of a step size factor μ(k) and a random vector $\vec{\Delta}$(k). The step size factor μ(k) may be set as either a constant (e.g., μ(k)=1) or a variable. Elements of the random vector $\vec{\Delta}$(k) may be set in compliance with pre-defined distribution, for example, uniform distribution U(−π/8,π/8).

It should note that this embodiment of the present disclosure is different from random phase rotation method, where the phase vector is generated randomly in each iteration. That is because, although the disturbance vector added to the phase rotation vector may be randomly generated, the iteration process provides a feedback to phase rotation to guide the determination of optimum phase rotation vector. Such "guided" search provides much better performance than a purely random phase rotation method. In fact, according to the results of simulations, the performance of the embodiments of the present disclosure is almost the same with "global" optimal algorithm, but the complexity is significantly reduced due to the simplicity of the iteration process.

In one another embodiment of the present disclosure, the disturbance vector $\vec{D}$(k) may be configured as a constant vector. Those skilled in the art may also choose any other suitable type of vectors to serve as the disturbance vector $\vec{D}$(k) according to practical system requirements, which however is not limited to the examples described herein.

The combined transmission signal S(n) may be computed dependent upon the temporary phase rotation vector $\vec{\phi}$'(k+1), and the largest peak power value of S(n), denoted as P'(k+1), is expressed as follows:

$$P'(k+1)=\max(S(n|\vec{\phi}'(k+1))) \quad 7)$$

In block S2102, the temporary peak power value P'(k+1) computed dependent upon the temporary phase rotation vector $\vec{\phi}$'(k+1) is compared with said peak power value P(k) computed dependent upon the phase rotation vector $\vec{\phi}$(k).

In block S2103, the newly-computed peak power value P(k+1) and the adjusted phase rotation vector $\vec{\phi}$(k+1) for the (k+1)$^{th}$ iteration are determined by:

$$\begin{cases} P(k+1) = P'(k+1), & \text{if } P'(k+1) < P(k) \\ P(k+1) = P(k), & \text{if otherwise.} \end{cases} \quad 8)$$

$$\begin{cases} \vec{\phi}(k+1) = \vec{\phi}'(k+1), & \text{if } P'(k+1) < P(k) \\ \vec{\phi}(k+1) = \vec{\phi}(k), & \text{if otherwise.} \end{cases}$$

The blocks S2101-S2103 of FIG. 3 are repeatedly performed until either of Condition 1) or Condition 2) as set forth in FIG. 2 is satisfied. Then, the process flow will proceed with blocks S220 and S230 as illustrated in FIG. 2.

FIG. 4 schematically illustrates a block diagram of a transmitter 400 according to one or more embodiments of the present disclosure.

As shown in FIG. 4, the transmitter 400 comprises a peak power computing unit 410, a phase rotation vector adjusting unit 420, a phase rotating unit 430 and a transmitting unit 440.

The peak power computing unit 410 is configured to compute a peak power value P(k) for a combined transmission signal including respective components of a plurality of frequency resource units.

The phase rotation vector adjusting unit 420 is configured to iteratively adjust, based on the peak power value P(k) computed by the peak power computing unit 410, a phase rotation vector $\vec{\phi}(k)$ which is applied to the respective components of the plurality of frequency resource units to perform phase rotation on said respective components of the plurality of frequency resource units. The phase rotation vector adjusting unit 420 continuously performs its functionalities until a peak power value P(k+1) newly computed by the peak power computing unit (410) dependent upon the adjusted phase rotation vector $\vec{\phi}(k+1)$ is lower than or equal to a pre-defined peak power threshold (Condition 1) or an iteration number reaches a pre-defined maximum value (Condition 2).

According to one or more embodiments of the present disclosure, each of the plurality of frequency resource units may comprise one or more carriers or subcarriers. The one or more carriers or subcarriers within a frequency resource unit may as a whole be phase rotated by a respective phase rotation element of the phase rotation vector $\vec{\phi}(k)$.

The phase rotating unit 430 is configured to perform phase rotation on the respective components of the plurality of frequency resource units by applying the adjusted phase rotation vector $\vec{\phi}(k+1)$. According to one or more embodiments of the present disclosure, the phase rotating unit 430 may be configured to perform phase rotation on the respective components of the plurality of frequency resource units by applying the adjusted phase rotation vector $\vec{\phi}(k+1)$ on the plurality of frequency resource units. Alternatively, the phase rotating unit 430 may be configured to perform phase rotation on the respective components of the plurality of frequency resource units by applying the phase rotation vector on signals to be modulated on the plurality of frequency resource units.

The transmitting unit 440 is configured to transmit the combined transmission signal of the respective components of the plurality of frequency resource units phase-rotated by the phase rotating unit 430.

According to one or more embodiments of the present disclosure, the phase rotation vector adjusting unit 420 may comprise a temporary phase vector generating unit 4201. The temporary phase vector generating unit 4201 can be configured to obtain a temporary phase rotation vector $\vec{\phi}'(k+1)$ by adding a disturbance vector to the phase rotation vector $\vec{\phi}(k)$.

According to one embodiment, the disturbance vector may be a random disturbance vector. For example, the random disturbance vector may be a product of a step size factor and a random vector whose elements are in compliance with predefined distribution.

In an alternative embodiment, the disturbance vector may be a constant vector or any other vector which is suitable to practical system requirements.

The phase rotation according to the present disclosure can be solely implemented on base station side or user equipment side. As such, according to one embodiment, the transmitter 400 may be a base station. In another embodiment, the transmitter 400 may be a user equipment. Therefore, the user equipment and the base station according to one or more embodiments of the present disclosure do not need extra signaling to communicate with each other.

The phase rotation vector adjusting unit 420 may further comprise a comparing unit 4202 and a determining unit 4203. The comparing unit 4202 can be configured to compare the temporary peak power value P'(k+1) computed dependent upon the temporary phase rotation vector $\vec{\phi}'(k+1)$ with the peak power value P(k) dependent upon the phase rotation vector $\vec{\phi}(k)$. The determining unit 4203 may be configured to determine the newly-computed peak power value P(k+1) and the adjusted phase rotation vector $\vec{\phi}(k+1)$ for the $(k+1)^{th}$ iteration by:

$$\begin{cases} \vec{\phi}(k+1) = \vec{\phi}'(k+1), & \text{if } P'(k+1) < P(k) \\ \vec{\phi}(k+1) = \vec{\phi}(k), & \text{if otherwise.} \end{cases}$$

$$\begin{cases} P(k+1) = P'(k+1), & \text{if } P'(k+1) < P(k) \\ P(k+1) = P(k), & \text{if otherwise.} \end{cases}$$
8)

According to one or more embodiments of the present disclosure, the iteration process for adjusting the phase rotation vector is employed to determine an optimum phase rotation vector over finite-time iterations. The embodiments according to the present disclosure can achieve a good PAPR reduction level; at meanwhile, they also significantly reduce the computation complexity and save the storage space required in determining the optimum phase rotation vector due to the simplicity of the iteration process.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the inventions may be practiced in various components such as integrated circuit chips and modules. As well known in the art, the design of integrated circuits is by and large a highly automated process.

The present invention may also be embodied in the computer program product which comprises all features capable of implementing the method as depicted herein and may implement the method when loaded to the computer system.

The present invention has been specifically illustrated and explained with reference to the preferred embodiments. The skilled in the art should understand various changes thereto in form and details may be made without departing from the spirit and scope of the present invention.

What is claimed is:

1. A method for peak to average power ratio (PAPR) reduction, comprising:

iteratively adjusting, based on a computed peak power value P(k) for a combined transmission signal including respective components of a plurality of frequency resource units, a phase rotation vector $\vec{\phi}(k)$ which is applied to said respective components of said plurality of frequency resource units to perform phase rotation on said respective components of said plurality of frequency resource units, until a newly-computed peak power value P(k+1) dependent upon the adjusted phase rotation vector $\vec{\phi}(k+1)$ is lower than or equal to a pre-defined peak power threshold or an iteration number reaches a pre-defined maximum value;

performing phase rotation on said respective components of said plurality of frequency resource units by applying the adjusted phase rotation vector $\vec{\phi}(k+1)$; and transmitting the combined transmission signal of said respective components of said plurality of frequency resource units phase-rotated by said adjusted phase rotation vector $\vec{\phi}(k+1)$.

2. The method of claim 1, wherein iteratively adjusting said phase rotation vector comprises:

obtaining a temporary phase rotation vector $\vec{\phi}(k+1)$ by adding a disturbance vector to said phase rotation vector $\vec{\phi}(k)$.

3. The method of claim 2, wherein said disturbance vector is a random disturbance vector or a constant vector.

4. The method of claim 3, wherein said disturbance random vector is a product of a step size factor and a random vector whose elements are in compliance with predefined distribution.

5. The method of claim 2, wherein iteratively adjusting said phase rotation vector comprises:

comparing a temporary peak power value P'(k+1) computed dependent upon the temporary phase rotation vector $\vec{\phi}'(k+1)$ with said peak power value P(k) computed dependent upon the phase rotation vector $\vec{\phi}(k)$;

determining the newly-computed peak power value P(k+1) and the adjusted phase rotation vector $\vec{\phi}(k+1)$ for the $(k+1)^{th}$ iteration by:

$$\begin{cases} \vec{\phi}(k+1) = \vec{\phi}'(k+1), & \text{if } P'(k+1) < P(k) \\ \vec{\phi}(k+1) = \vec{\phi}(k), & \text{if otherwise.} \end{cases}$$

$$\begin{cases} P(k+1) = P'(k+1), & \text{if } P'(k+1) < P(k) \\ P(k+1) = P(k), & \text{if otherwise.} \end{cases}$$

6. The method of claim 1, wherein performing phase rotation on said respective components of said plurality of frequency resource units comprises:

performing phase rotation on said respective components of said plurality of frequency resource units by applying the adjusted phase rotation vector $\vec{\phi}(k+1)$ on said plurality of frequency resource units;

or performing phase rotation on said respective components of said plurality of frequency resource units by applying the adjusted phase rotation vector $\vec{\phi}(k+1)$ on signals to be modulated on said plurality of frequency resource units.

7. The method of claim 1, wherein each of said plurality of frequency resource units comprises one or more carriers or subcarriers.

8. A transmitter comprising circuitry configured as:

a peak power computing unit configured to compute a peak power value P(k) for a combined transmission signal including respective components of a plurality of frequency resource units;

a phase rotation vector adjusting unit configured to iteratively adjust, based on the peak power value P(k) computed by said peak power computing unit, a phase rotation vector $\vec{\phi}(k)$ which is applied to said respective components of said plurality of frequency resource units to perform phase rotation on said respective components of said plurality of frequency resource units, until a peak power value P(k+1) newly computed by said peak power computing unit dependent upon the adjusted phase rotation vector $\vec{\phi}(k+1)$ is lower than or equal to a pre-defined peak power threshold or an iteration number reaches a pre-defined maximum value;

a phase rotating unit configured to perform phase rotation on said respective components of said plurality of frequency resource units by applying the adjusted phase rotation vector $\vec{\phi}(k+1)$; and a transmitter unit configured to transmit the combined transmission signal of said respective components of said plurality of frequency resource units phase-rotated by said phase rotating unit.

9. The transmitter of claim 8, wherein said phase rotation vector adjusting unit comprises a temporary phase vector generating unit configured to obtain a temporary phase rotation vector $\vec{\phi}'(k+1)$ by adding a disturbance vector to said phase rotation vector $\vec{\phi}(k)$.

10. The transmitter of claim 9, wherein said disturbance vector is a random disturbance vector or a constant vector.

11. The transmitter of claim 10, wherein said random disturbance vector is a product of a step size factor and a random vector whose elements are in compliance with predefined distribution.

12. The transmitter of claim 9, wherein said phase rotation vector adjusting unit comprises:

a comparing unit configured to compare a temporary peak power value P'(k+1) computed dependent upon the temporary phase rotation vector $\vec{\phi}'(k+1)$ with said peak power value P(k) dependent upon the phase rotation vector $\vec{\phi}(k)$;

a determining unit configured to determine the newly-computed peak power value P(k+1) and the adjusted phase rotation vector $\vec{\phi}(k+1)$ for the $(k+1)^{th}$ iteration by:

$$\begin{cases} \vec{\phi}(k+1) = \vec{\phi}'(k+1), & \text{if } P'(k+1) < P(k) \\ \vec{\phi}(k+1) = \vec{\phi}(k), & \text{if otherwise.} \end{cases}$$

-continued $$\begin{cases} P(k+1) = P'(k+1), & \text{if } P'(k+1) < P(k) \\ P(k+1) = P(k), & \text{if otherwise.} \end{cases}$$

13. The transmitter of claim 8, wherein
said phase rotating unit is configured to perform phase rotation on said respective components of said plurality of frequency resource units by applying the adjusted phase rotation vector $\tilde{\vec{\phi}}(k+1)$ on said plurality of frequency resource units;
or
said phase rotating unit is configured to perform phase rotation on said respective components of said plurality of frequency resource units by applying the phase rotation vector on signals to be modulated on said plurality of frequency resource units.

14. The transmitter of claim 8, wherein
each of said plurality of frequency resource units comprises one or more carriers or subcarriers.

15. The transmitter of claim 8, wherein the transmitter is a base station or a user equipment.

* * * * *